United States Patent [19]

Bikson et al.

[11] Patent Number: 5,131,927
[45] Date of Patent: Jul. 21, 1992

[54] REACTIVE TREATMENT OF COMPOSITE GAS SEPARATION MEMBRANES

[75] Inventors: Benjamin Bikson, Brookline; Joyce K. Nelson, Lexington, both of Mass.

[73] Assignee: Union Carbide Industrial Gases Technology Corporation, Danbury, Conn.

[21] Appl. No.: 688,327

[22] Filed: Apr. 22, 1991

[51] Int. Cl.$^5$ .................. B01D 53/22; B01D 71/68
[52] U.S. Cl. .......................... 55/16; 55/158; 264/41
[58] Field of Search ............. 55/16, 68, 158; 264/41

[56] References Cited

U.S. PATENT DOCUMENTS

| | | | |
|---|---|---|---|
| 3,616,607 | 11/1971 | Klass et al. | 55/16 |
| 3,980,456 | 9/1976 | Browall | 55/158 |
| 4,230,463 | 10/1980 | Henis et al. | 55/16 |
| 4,243,701 | 1/1981 | Riley et al. | 427/244 |
| 4,318,714 | 3/1982 | Kimura et al. | 55/16 |
| 4,530,703 | 7/1985 | Malon et al. | 55/16 |
| 4,575,385 | 3/1986 | Brooks et al. | 55/158 |
| 4,602,922 | 7/1986 | Cabasso et al. | 55/158 |
| 4,634,531 | 1/1987 | Nakagawa et al. | 210/639 |
| 4,652,283 | 3/1987 | Zampini et al. | 55/16 X |
| 4,654,055 | 3/1987 | Malon et al. | 55/158 |
| 4,728,346 | 3/1988 | Murphy | 55/16 X |
| 4,767,422 | 8/1988 | Bikson et al. | 55/16 |
| 4,776,936 | 10/1988 | Smith et al. | 55/158 X |
| 4,781,733 | 11/1988 | Babcock et al. | 55/16 |
| 4,824,870 | 4/1989 | Pemawansa et al. | 55/16 X |
| 4,863,496 | 9/1989 | Ekiner et al. | 55/158 |
| 4,871,461 | 10/1989 | Karakane et al. | 55/16 X |
| 4,877,528 | 10/1989 | Friesen et al. | 210/500.29 |
| 4,881,954 | 11/1989 | Bikson et al. | 55/16 |
| 4,900,626 | 2/1990 | Fabre | 55/16 X |
| 4,919,694 | 4/1990 | Hata et al. | 55/16 X |
| 4,941,893 | 7/1990 | Hsieh et al. | 55/16 |
| 4,950,314 | 8/1990 | Yamada et al. | 55/158 |
| 4,952,220 | 8/1990 | Langsam et al. | 55/16 X |
| 5,009,678 | 4/1991 | Bikson et al. | 55/16 |
| 5,011,518 | 4/1991 | Ogawa | 55/158 |
| 5,032,149 | 7/1991 | Hayes | 55/16 |
| 5,034,024 | 7/1991 | Hayes | 55/16 |

FOREIGN PATENT DOCUMENTS 1-123617  5/1989  Japan .................. 55/158

*Primary Examiner*—Robert Spitzer
*Attorney, Agent, or Firm*—Alvin H. Fritschler

[57] ABSTRACT

This invention relates to methods for producing composite gas separation membranes by treating the gas separation layer of the composite membranes with a treating agent that ionically bonds to the gas separation membrane layer of the treated composite membrane. The invention also relates to the membranes produced and to gas separation processes utilizing the improved membranes.

32 Claims, No Drawings

5,131,927

REACTIVE TREATMENT OF COMPOSITE GAS SEPARATION MEMBRANES

FIELD OF THE INVENTION

This invention relates to processes for treating the separation layer of gas separation composite membranes with a treating agent to improve solvent resistance of said gas separation layer while simultaneously sealing residual imperfections.

BACKGROUND OF THE INVENTION

Asymmetric and composite membranes capable of selectively separating one component of a gaseous mixture from another component are known in the art. For practical commercial operations the composite membranes must be durable, essentially free of imperfections, capable of achieving an acceptable level of selectivity of the desired component and exhibit high permeation rate for the fast permeating component of the gas mixture. Often, however, the gas separation layer deposited on the surface of the substrate of a substrate does not fully meet the required needs; for instance, it may not be adequately resistant to the solvent effects of the gas/vapor mixture that can condense onto the membrane surface during the gas separation process or it may contain microscopic residual pores or other defects. Thus, continued efforts are being expended to improve the structure and efficiency of composite membranes.

Integrally skinned asymmetric membranes are currently used extensively for numerous gas separation processes. Though manufacturing of essentially defect-free ultrahigh flux asymmetric membrane is known in the art, see for example U.S. Pat. No. 4,902,422 and U.S. Pat. No. 4,772,392, it is known to be excessively difficult. Thus, it is common in the art to subject gas separation membranes to treatments that effectively eliminate defects which may be present in ultrathin membrane separation layers. Henis and Tripodi in U.S. Pat. No. 4,230,463 have addressed the presence of defects in asymmetric gas separation membranes by applying a coating. The multi-component membranes produced by this coating process typically comprise a silicone rubber coating on the surface of an asymmetric membrane made of a glassy polymer. Additional defect-repair methods can be found in U.S. Pat. Nos. 4,877,528, 4,746,333 and 4,776,936.

A different class of gas separation membranes, the composite membranes, is produced by depositing a thin gas separation layer on a porous support wherein the material of the deposited layer determines the gas separation characteristics of the overall structure. These composite membranes are sometimes more advantageous since they allow decoupling of the material requirements for a particular gas separation application from engineering design requirements of the porous support. A variety of separation layer materials, support structures and membrane manufacturing methods are known in the art for producing composite membranes. Typical examples of composite gas separation membranes can be found in U.S. Pat. Nos. 4,243,701, 3,980,456, 4,602,911 and 4,881,954.

Difficulties are also sometimes encountered in the preparation of defect-free composite membranes for gas separation, particularly for gas separation materials with very high cohesive energy density such as polymeric materials that contain ionic groups. We have discovered that certain deficiencies of such composite membranes can be corrected by treating the gas separation layer per se with a dilute solution of a material that will chemically react or ionically bond to the material of the gas separation layer. In addition to improved gas separation performance, the membranes of this invention frequently will exhibit improved solvent resistance characteristics.

U.S. Pat. No. 3,980,456, issued Sept. 14, 1976 to W. R. Browall, discloses a process for patching breaches in a composite membrane by coating the entire outer surface of the composite membrane by casting a layer of sealing polymer material over the entire surface (column 2, lines 37 to 40) of the composite membrane so as to cover surfaces particle impurities and seal pinholes. U.S. Pat. No. 4,767,422, issued Aug. 30, 1988 to B. Bikson, et al., discloses a method for repairing defects in composite membranes by post-treating with a volatile solvent, with or without minute amounts of additives, followed by evaporation. The concept of treating the gas separation layer of a composite membrane with a reactive treating agent and ionically binding a reactive treating agent to the gas separation layer of the composite membrane is neither suggested nor disclosed in U.S. Pat. No. 3,980,456 and U.S. Pat. No. 4,767,422.

U.S. Pat. No. 4,602,922, issued July 29, 1986, I. Cabasso, et al., discloses the preparation of improved composite membranes by depositing a thin layer of aminoorganofunctional polysiloxane on the surface of a highly porous polymer substrate, such as polysulfone substrate, and in-situ crosslinking the amino siloxane units with diisocyanate and using the crosslinked polysiloxane as a gutter layer. A gas separation layer is coated on the gutter layer to provide a double-layer composite membrane which has a higher separation factor than the crosslinked polysiloxanes.

U.S. Pat. No. 4,243,701, issued Jan. 6, 1981 to Riley, et al., discloses a method for coating a preformed porous support membrane by passing a surface thereof through a solution which contains a mixture of the semipermeable gas separation membrane forming prepolymer and a crosslinking agent and then heating the coated surface to crosslink the prepolymer to form the composite membrane. It does not disclose or suggest treating a preformed composite membrane with a reactive treating agent.

In U.S. Pat. No. 4,877,528, issued Oct. 31, 1989 to D. T. Friesen, et al., siloxane-grafted cellulosic semipermeable membranes are disclosed. The defects in the gas separation layer of an asymmetric cellulosic gas separation membrane are sealed by covalently binding polysiloxane containing functional groups to the cellulosic material. The two reactive materials react and chemically bind by ether, ester, amide or acrylate linkages to form a siloxane-grafted cellulosic membrane having improved selectivity.

In U.S. Pat. No. 4,863,496, issued Sept. 5, 1989 to O. M. Ekiner, et al., reactive post-treatments for gas separation membranes are disclosed. Specifically the process disclosed entails applying a reactive monomeric material to the surface and polymerizing the monomeric material applied on the surface of the gas separation membrane in order to improve the permselectivity of the membrane with at least one pair of gases.

U.S. Pat. No. 4,634,531, issued Jan. 6, 1987 to Y. Nakagawa, et. al., relates to the sequential treatment of semipermeable membranes with at least two different water soluble organic materials that will react and form a water insoluble or very slightly water soluble material on the semipermeable membrane. The invention requires a combination of at least two sequential treatments with aqueous solutions of materials which mutually react at once upon contact, for example, a first treatment with an aqueous amine solution followed by a second treatment with an aqueous aldehyde solution. This series of sequential treatments is applied to the surface of an asymmetric membrane, or to the surface of a composite membrane composed of a support having a thin film barrier coated thereon. The treatment effected by this invention serves to form an additional layer on the surfaces of the asymmetric membranes and the composite membranes treated. The patent teaches the formation of an additional layer on the surface of the composite membrane, it does not suggest or disclose the concept of treating the gas separation layer per se of the composite membrane with a treating agent that will react with the gas separation layer or ionically bond to the gas separation layer per se of the composite membrane.

SUMMARY OF THE INVENTION

This invention pertains to methods for improving the separation performance of composite membranes by treating the gas separation layer of said composite membranes with a dilute solution of a chemically active material that reacts or ionically bonds to the gas separation layer, thus modifying the gas separation layer and simultaneously essentially sealing residual imperfections that may be present in this layer, and to the improved gas separation membranes produced. In the composite membranes of this invention substantially all of the separation of the gases is provided for by the gas separation layer not the porous support or substrate.

DETAILED DESCRIPTION OF THE INVENTION

This invention provides methods for treating the gas separation layer of a composite membrane so as to alter its original chemical structure and, generally, to simultaneously seal residual surface imperfections such as pinholes and small residual pores; this invention also relates to processes for using the treated membranes for separating mixtures of gases. This has been accomplished by treating the gas separation layer of a composite membrane with a dilute solution of a material that is reactive with the material of the gas separation layer and reduces the surface tension (surface energy) of the composite membrane.

Composite membranes are known to consist of at least two layers, a porous substrate and at least one gas separation layer deposited on the substrate's surface. For example, a porous polysulfone hollow fiber substrate having deposited on its surface a sulfonated polysulfone gas separation layer. This is but one examples of a wide variety of substrates and gas separation layers that are known. This invention generally concerns itself with composite membranes in which the material comprising the gas separation layer (i) contains groups that will react with the treating agent applied by the process of this invention and (ii) the application of the treating agent will reduce significantly the surface energy of the composite membrane. As used throughout this specification the term "treating agent" (or variant thereof) means a material that either reacts with the material that comprises the gas separation layer and reduces the surface energy of the composite membrane.

The composite membranes subject to the post-treatments according to the methods of this invention can consist of one or more layers deposited on a porous support. However, it is understood that it is the external layer responsible for the ultimate gas separation characteristics of the composite that is the subject of these treatments, i.e. the gas separation layer.

An important advantage provided by the method of this invention is the direct chemical binding or strong physical interaction between the post-treating material and the material of the gas separation layer of the composite membrane. The post-treating material is reacted with the gas separation layer material. This interaction provides for an improved solvent resistance and is accomplished through a direct ionic bonding between the ionic groups of the post-treating material and the material of the gas separation layer; or through coordination bonding, for example, between primary amino groups of the post-treating material and the transition metal counter-ions, e.g. Co or Cu, of the gas separation layer material; or by a strong multiple hydrogen bonding between the post-treating material and the material of the gas separation layer. By the term "reacted" it is meant that the post-treated gas separation layer becomes essentially resistant to dissolution and removed by a subsequent solvent wash. The term "reacted" includes all of the above-described interaction phenomena. An additional important feature of the methods of this invention is the use of treating agent materials that reduce significantly the surface tension (surface energy) of the gas separation layer of the composite membrane; the critical surface tension of the treating material at 20° C. is frequently less than about 40 dyne/cm and preferably below about 30 dyne/cm. It is understood, however, that although the surface tension of the treated gas separation layer will be significantly lower than the surface tension of the parent untreated gas separation layer, it can be somewhat higher than the surface tension of the treating material, particularly when the thickness of the deposited material is below 50Å. The surface tension values of the treating materials, both liquid and solid, can be found in appropriate publications, for example, "Organic Solvents Physical Properties and Methods of Purification", Techniques of Chemistry, Volume II, J. A. Raddick, W. B. Bunger and T. K. Sakano, John Wiley & Sons, 1986; or can be determined by methods well known in the art, for example, "Physical Chemistry of Surfaces", A. W. Adamson, Interscience Publishers, 1976.

The post-treating material is applied from a fluid solvent system, preferably as a dilute solution or sometimes as a fine suspension. The solvent system for the post-treating material should be reasonably volatile and compatible with the construction materials of the composite membrane, e.g. the solvent system should not dissolve or excessively swell the materials of the gas separation layer or the porous substrate structure of the composite. Typical solvents can include aliphatic hydrocarbons such as pentane, hexane, cyclohexane, and the like; chlorinated, fluorinated or chlorofluorocarbons; alcohols such as methanol or ethanol or their mixtures with water and lower ketones, and the like.

It should be further noted that although the gas separation layer of the composite membrane is frequently treated on the side that is not supported by the porous support structure, the treatment can be applied on the side supported by the porous support structure as well. To assure that the entire membrane surface is in contact with the post-treating solution, it can sometimes be beneficial to impose a pressure differential across the membrane. For example, a vacuum can be applied to the membrane side opposite to the side that is in contact with the post-treating solution. The pressure differential employed should not, of course, exceed the yield point of the membrane structure.

The gas separation layer of the composite membrane is treated with a dilute solution of the treating agent. This solution can contain up to about 5% by weight or more, preferably less than about 2% by weight, of the treating agent. The solvent used to prepare the dilute solution is a nonsolvent for the materials of the composite membrane (both the substrate and gas separation layer) but is a solvent for the treating agent, it can be a single solvent or a mixture of solvents. It can, however, also be a mild swelling agent for the materials of the gas separation layer of the composite membrane; this can be beneficial when an in-depth treatment is desired. Frequently the treatment is followed by washing to remove any excess of unreacted material. The dilute treating agent solution may optionally contain mixtures of materials, some of which may not be reactive or capable of ionically bonding with the gas separation layer, and can further be mixtures of low and high molecular weight oligomers and/or polymers. Particularly beneficial may be mixtures of reactive treating agents with materials that do not react with the membrane gas separation layer but do contain functional groups that can undergo crosslinking creating an interpenetrating network with the reactive treating agents. The crosslinking is carried out after the treatment of the composite membrane has been completed and the volatile solvent system completely removed. Polysiloxane materials containing reactive groups that can undergo crosslinking at elevated temperatures can be particularly useful. The reactive treating agent should be at least 25 percent by weight of the total solids content and all treating materials should further satisfy the requirement of surface tension below about 40 dyne/cm.

The treating material will contain at least one group that is reactive towards the material of the gas separation layer; for example, an amino group in the treating material will react with a sulfonic group in the gas separation layer material, or vice versa. The treating material can be monofunctional or polyfunctional; when polyfunctional the treatment leads to crosslinking. The treating material is preferably polyfunctional.

The surface layer of the composite membrane that can be treated by the method of this invention will typically contain ionic groups such as sulfonic, sulfinic, carboxylic, phosphoric, etc. Such composites can be effectively treated with materials that contain basic groups, for example, primary, secondary, tertiary, and quaternary amine groups to provide an ionic binding between the material of the composite and the treating material. Conversely, the separation layer of the composite membrane may contain basic groups while the treating material may contain acidic groups. Examples of gas separation layer materials include cation exchange materials such as sulfonated polysulfones, sulfonated polystyrenes, sulfonated polyaryletherketones, sulfonated polyphenylene oxides, or conversely anion exchange materials such as polyvinylamines, polyvinylpyridines; polysulfones and polyphenylene oxides modified with amino functional groups, etc.

The concentration of ionic groups in the surface layer of the composite can range from as low as 0.1 meq/g and lower to as high as 3 meq/g and higher, and typically will range between 0.5 to 2 meq/g and will comprise acidic or basic groups. When the surface layer of the composite membrane contains acidic groups, these groups can be further partially or completely neutralized with alkaline and alkaline earth metals, transition metals, or organic cations. It was further found that even when all acidic groups in the surface layer of the composite are neutralized a strong binding can still take place with basic groups of the treating material through coordination bonds, for example, between transition metal ions in the composite layer and the amino groups of the treating material, or through multiple hydrogen bonding. It was further found that for most effective treatments, the molecular weight of the treating material should be preferably above 200 to provide for successful and consistent sealing of any residual imperfections and may on occasion desirably be above 500.

Examples of the materials for treating composite membranes suitable for the practice of this invention include: polyorganosiloxanes; resins with fluorine containing groups including units of the following structures: —CF$_3$, —CF$_2$, —CH$_2$—CFH—, —CF$_2$—CFCl—, —CF$_2$—CH$_2$, —CHF—CH$_2$—,

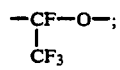

dienes or acetylenes, such as polybutene, polyisobutene, polypentene, polyhexene, polymethylpentene, polybutadiene; polystyrenes and poly-alpha-methyl styrene based polymers, particularly containing perfluoro or siloxane groups. In all cases, the treating material must contain groups that bind to or react with the materials of the gas separation layer of the composite membrane and meet the critical surface tension requirements.

One can use a fluorohydrocarbon containing amino functional groups or an amino functional siloxane containing perfluorohydrocarbon groups.

In one embodiment the amino functional siloxane contains at least one dimethyl-siloxane unit and at least one amino functional unit such as

where R is a divalent hydrocarbyl radical containing from 1 to 6 carbon atoms.

An example is 1.3-bis(4-aminobutyl)tetramethyldisiloxane of the following structure

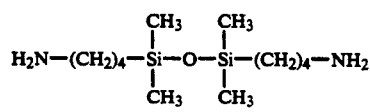

In another embodiment the polysiloxane can contain up to about 200 siloxane units per molecule and is a random terpolymer containing 2 trimethylsiloxy units, 2 to 100 dimethylsiloxane units, and 2 to 6 aminosiloxane units, such as

in which R is a divalent hydrocarbyl alkyl group containing from 1 to 6 carbon atoms or a divalent alkyoxyalkyl radical —ROR'$_n$— in which R' contains 2 to 4 carbon atoms and n has a value of from 1 to about 6 or more.

Some preferred random polysiloxanes have the following average formula

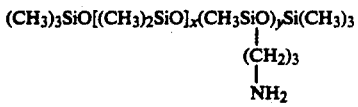

where x and y have values such that the polysiloxane contains about 7 mol % of aminosiloxane units.

The composite gas separation membranes that can be effectively treated by the methods of this invention can be in a flat sheet or hollow fiber configuration and can be manufactured by solution deposition method or any other method known in the art; in the preferred embodiment, the gas separation membranes are composite hollow fiber membranes.

Advantageously, porous polysulfone hollow fibers can be used as porous supports with the thin separation layer deposited onto the exterior of the hollow fibers. The thickness of the gas separation layer can be up to 10,000Å thick, frequently below 2,000Å and sometimes less than 1,000Å thick. The thickness being frequently determined by the requirements of the specific gas/vapor separation application.

As has been specified, the gas separation layer of the composite membrane that is treated with the treating agent by the process of this invention contains reactive sites or groups that will react with or ionically bond to the reactive groups of the treating agent while simultaneously having any residual imperfections in the surface layer sealed. Among such gas separation layer materials one can mention sulfonated polysulfones, such as sulfonated polyether sulfone, sulfonated polyarylether sulfones, sulfonated hexafluoro polysulfones, sulfonated polystyrenes, sulfonated polyarylether ketones, and sulfonated polyarylethers, such as sulfonated polyphenyleneoxide, etc. The porous polysulfone hollow fiber substrates useful for composite membrane preparation are frequently spun from a ternary solution of commercially available polysulfone (P-3500, Amoco Performance Products) in a solvent/nonsolvent mixture. These procedures are described by I. Cabasso in "Composite Hollow Fiber Membranes", Journal of Applied Polymer Sciences, 23, 1509-1523 and in "Research and Development of NS-1 and Related Hollow Fibers for Reverse Osmosis Desalination of Seawater:", PB 248,666, prepared for the Office of Water Research and Technology, Contract No. 14-30-3165, U.S. Department of the Interior, July 1975.

The well known tube-in-tube jet technique was used in this specification for the spinning procedure, with water at about room temperature being the outside quench medium for the fibers and air being the quench medium in the bore. Quenching was followed by extensive washing to remove pore-forming material. Following the wash the hollow fibers were dried at elevated temperature and water was removed by passing the hollow fibers through a hot air drying oven.

The porous polysulfone hollow fibers were used to prepare composite sulfonated polysulfone membranes, the fibers ranged in outside diameter from 0.5 to 0.35 mm and inside diameter from 0.33 to 0.15 mm. The dry polysulfone hollow fibers were coated with the sulfonated polysulfone gas separation layer by conventional solution deposition techniques followed the post-treatments of this invention put forward in detail in the examples that follow.

In an embodiment of this invention the treating solution comprised of the amino functional siloxane 1.3-bis(4-aminobutyl)tetramethyldisiloxane is applied to a composite membrane comprised of a polysulfone hollow fiber coated with a thin gas separation layer of sulfonated poly[oxy-1,4-phenylenesulfonyl-1, 4-phenylenoxy-1,4-phenylene-[2,2, 2-trifluoro-1-(trifluoromethyl)ethylidene]-1,4-phenylene] (hereinafter F6-SPS). The preparation of sulfonated F6-SPS materials is described in detail in U.S. Pat. No. 4,971,675 incorporated herein by reference. Details of the preparation of the composite sulfonated polysulfone hollow fiber membranes can be further found in pending U.S. patent application Ser. No. 07/609,625, now U.S. Pat. No. 5,067,971, also incorporated herein by reference.

The improved composite membranes produced by the process of this invention can be used to separate a gaseous component from a mixture of said gaseous component with other gases. Illustrative gas mixtures include oxygen/nitrogen, carbon dioxide/ methane, carbon dioxide/light hydrocarbons, hydrogen/ carbon monoxide, hydrogen/methane, hydrogen/nitrogen, ammonia/nitrogen, hydrogen sulfide/methane, etc. Advantageously the composite membranes of this invention can be utilized in such gas separation processes as nitrogen generation, hydrogen recovery from refinery streams, drying of air streams and natural gas streams, carbon dioxide removal from natural gas streams, to mention a few.

The following examples serve to further illustrate the invention, but should not be construed as limiting the scope of the invention as set forth in the appended claims.

EXAMPLE 1

Part A. Preparation of Sulfonated F6-BisA

Polysulfone (F6-SPS)

One hundred and twenty-five g of polysulfone poly[-(oxy-1,4-phenylenesulfonyl-1,4-phenyleneoxy-1, 4-phenylene-[2,2,2-trifluoro-1-(trifluoromethyl)ethylidene]-1,4-phenylene]) (hereinafter identified as F6-BisA) were dissolved in 1,250 ml of methylene chloride in a reaction flask equipped with a mechanical stirrer, thermometer, condenser and nitrogen inlet and outlet. The content of the reaction flask was cooled to −4° C. and 66.14 g of chlorosulfonic acid dissolved in 337 ml of methylene chloride were added to the reaction mixture over a period of 45 minutes under nitrogen atmosphere at −6° C. The reaction flask was brought to room temperature, circa 25° C., and the reaction mixture stirred for a total period of about six hours. The reaction was terminated, the methylene chloride was decanted, and the precipitate was washed with methylene chloride three times and dissolved in 1,000 ml of ethanol and rotoevaporated to recover the sulfonated polysulfone F6-SPS. A portion of the dry rotoevaporated F6-SPS was dissolved in an ethanol-water mixture and dialyzed using conventional cellulose dialysis bags. The dialyzate was rotoevaporated to dryness and dried in a vacuum oven at 70° C. to a constant weight. The ion exchange capacity of the dry sample of the sulfonated F6-BisA-polysulfone (F6-SPS) was determined to be 1.24 meq/g of dry polymer in H+ form, which corresponds to a degree of sulfonation (DS) of 0.75.

Part B. Preparation of Composite F6-SPS Hollow Fiber Membranes

Composite membranes were prepared by coating porous polysulfone (PS) hollow fibers with a solution of the F6-SPS in reagent alcohol. The coating solution was prepared by dissolving 1.5 g of F6-SPS prepared as described in Part A above in 100 ml of reagent alcohol. The composite membranes were manufactured by passing dry polysulfone hollow fibers through the coating solution that was maintained at 46° C. ±2° C. The solvent was evaporated by passing the coated fibers through a drying oven at circa 95° C. with a residence time of 42 seconds.

Part C. Module Preparation and Testing of F6-SPS

Modules were prepared for testing by encapsulating the ends of a bundle of filaments about 20 cm long in an epoxy tubesheet to separate the high pressure side from the low pressure side. The modules were tested for carbon dioxide and methane separation at close to zero stage cut conditions. The feed gas was a mixture of 20% carbon dioxide and 80% methane that had been saturated with water (e.g., the dew point was about 15° C.).

Part D. Treatment of Composite Hollow Fiber Membrane Modules with Amino Functional Silicone Fluids Sample I.

The F6-SPS hollow fiber modules prepared and tested as described in Part C above were further treated with a polyfunctional amino silicone fluid:

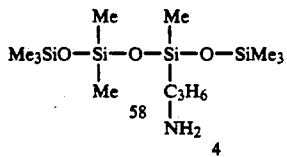

The solution was prepared by dissolving 0.5 g of amino functional silicone fluid, GP-4, obtained from Genesee Polymer Corp., in 100 cc of cyclohexane. The modules were dipped into the solution for one minute, removed and air dried for 16 to 20 hours prior to testing. The gas separation performance of treated samples, as well as the untreated precursors, are summarized in Table 1.

Sample II.

The F6-SPS hollow fiber modules prepared as described in Part C above were treated with a bifunctional amino silicone, 1.3 bis(4-aminobutyl) tetramethyldisiloxane. The solution was prepared by dissolving 1.0 g of bifunctional amino silicone, B1704, obtained from Petrarch Systems, in a solvent mixture of 80% cyclohexane and 20% butanol (V/V). The modules were dipped into the solution for one minute, removed and air dried for 16 to 20 hours prior to testing. The gas separation results are summarized in Table 1.

TABLE 1

Effect of Amino Functional Treatments on the Separation and Permeation Characteristics of F6-SPS[a]

| DESIGNATION | TREATMENT | P/t ($CO_2$)[b] (× $10^6$) | $\alpha$ ($CO_2/CH_4$) |
|---|---|---|---|
| Sample I | Nontreated | 28.7 | 22.6 |
| Sample I | Treated | 26.6 | 40.2 |
| Sample II | Nontreated | 21.1 | 20.2 |
| Sample II | Treated | 21.8 | 31.5 |

[a]Gas permeation and separation results reported are the average of three or four membrane modules.
[b]Gas separation and permeation characteristics were measured at 1066 kPa and ambient temperature. The permeation rates are reported in units of $cm^3(STP)/cm^2 \cdot sec \cdot cm$ Hg.

As shown by the data in TABLE 1, the selectivity, $\alpha$, increased significantly in both instances after the treatment in accord with this invention.

EXAMPLE 2

Part A. Preparation of Composite Sulfonated Polysulfone (SPS) Hollow Fiber Membranes Composite gas separation membranes were prepared by coating porous polysulfone (PS) hollow fibers with a solution of sulfonated polysulfone (SPS) in an alcohol/water mixture. The coating solution contained 2.0% of sulfonated polysulfone (weight per volume) in a 90/10 2-propanol/water mixture. The composite membranes were prepared by passing dry polysulfone hollow fibers through the coating solution. The temperature of the coating solution was maintained at 46° C. ±2° C. The solvent was evaporated from the coated fibers in a dryer oven at 77° C. with a residence time of 42 seconds. The SPS polymer used in this example was prepared by sulfonating polysulfone (Udel 3500, Amoco Performance Products) with chlorosulfonic acid in a manner similar to that described in Example 1. The sulfonated polysulfone had a determined ion exchange capacity of 1.95 meq/g of dry polymer in H+ form or a degree of sulfonation (DS) of 0.9.

Part B. Preparation of Composite Hollow Fiber Permeator

A helically wound hollow fiber membrane permeator was constructed by the procedure described in U.S. patent application Ser. No. 07/479,475 using the composite hollow fiber membranes of Part A. The hollow fibers had an outer diameter of about 0.511 mm and an inner diameter of about 0.328 mm. The permeator contained 0.25 square meters of membrane area.

Part C. Treatment of Composite Hollow Fiber Membrane Permeator with Amino Function Silicone Sample I.

The composite hollow fiber membrane permeator described in Part B was treated with an amino functional silicone fluid that chemically binds to the gas separation layer of the sulfonated polysulfone and simultaneously seals any residual membrane imperfections. A 1% weight-by-volume solution was prepared by dissolving amino functional silicone fluid, GP-4, obtained from Genesee Polymer Corp., in cyclohexane. The solution was then brought into contact with the feed side of the permeator of the exterior surface of the hollow fibers. After 30 minutes, the solution was removed and the membrane module was dried by passing a stream of dry air through the permeator for about 20 to 24 hours.

Part D. Water and Air Permeation Testing

The permeator of Part C was used to dehydrate an air stream containing 2,200 ppmv of water vapor. The permeator was operated by using a shell-side feed while a dry sweep gas was used in the bores of the hollow fibers. The sweep gas was introduced counter-currently to the direction of the feed flow. The permeator was operated as disclosed in U.S. patent application Ser. No. 07/479,475, Example 1, Part D. The module was tested for water and air permeation properties at 791 kPa and 22° C. The dew point of the feed was −12° C. The sweep gas contained about 1 ppmv of water and was introduced at a pressure of 117 kPa. The permeator was also tested separately for oxygen and nitrogen permeation characteristics. The permeation results are summarized in Table 2.

Sample II

For comparative purposes, a permeator was prepared similar to the hollow fiber membrane permeator of Part C, Sample I, above, except that the premeator was treated with a silicone material that did not contain groups that can ionically bind to the gas separation layer of the composite membrane. The treating solution in this case was comprised of dimethylsiloxane. The treating solution was prepared by dissolving 1 gram of Sylgard 184, obtained from Dow Corning Corp., in 100 ml of cyclohexane. The module was tested for water vapor and air permeation properties as described in Part D above. The results are also summarized in Table 2.

TABLE 2

| Water and Air Permeation and Separation Characteristics of SPS Modules | | | | |
|---|---|---|---|---|
| $P/t (O_2)^a$ ($\times 10^8$) | $P/t (N_2)^a$ ($\times 10^8$) | $P/t (H_2O)^a$ ($\times 10^4$) | $\alpha$ ($H_2O/O_2$) | $\alpha$ ($H_2O/N_2$) |
| Sample I 32 | 88.9 | 21 | 6600 | 24,000 |
| Sample II 48 | 30 | 23 | 4700 | 7,400 |

$^a$The permeation rate is reported in units of cm$^3$(STP)/cm$^2$ · sec · cm Hg.

The results in Table 2 show that the treatment with the reactive amino functional silicone agent provided significantly higher $H_2O/O_2$ and $H_2O/N_2$ selectivity.

EXAMPLE 3

Part A. Preparation of Composite F6-SPS Hollow Fiber Membranes

Composite F6-SPS hollow fiber membranes were prepared essentially as described in Example 1 by coating dry polysulfone (PS) hollow fibers with 1% (weight by volume) solution of F6-SPS polymer in reagent alcohol/4-pentanone mixture (99/1 by volume). The F6-SPS polymer used in this experiment had an ion exchange capacity of 1.35 meq/g of dry polymer in H± form.

Part B. Module Preparation and Testing of F6-SPS Composite Hollow Fiber Membranes Modules were prepared from the composite membranes of Part A as described in Part C of Example 1 by encapsulating the ends of a bundle of filaments about 20 cm long in an epoxy tubesheet.

Part C. Treatment of the Composite Hollow Fiber Membranes with Amino Functional Silicone Fluid Sample I The F6-SPS hollow fiber modules prepared in Part B were treated with an amino functional silicone. The amino functional silicone chemically binds to the sulfonate hexafluoropolysulfone (F6-SPS) membrane sealing residual imperfections and modifying the selective gas separation layer. The amino functional silicone solution was prepared by dissolving 1g of the amino functional silicone fluid, GP-4, obtained from Genesee Polymer Corp., in 100 cc of cyclohexane. The modules were dipped into the solution for one minute, removed, and allowed to air dry for 16 to 20 hours before testing for hydrogen/methane separation.

Comparative Sample A

For comparative purposes, modules were prepared similar to the hollow fiber modules of Sample I except that the module was treated with a nonfunctional silicone. The treating solution in this comparative sample was comprised of dimethylsiloxane Sylgard 184, Dow Corning Corp., 1% (weight per volume) in cyclohexane. Comparative Sample A was also tested for hydrogen/methane separation.

EXAMPLE 4

In order to demonstrate the improved solvent resistance of composite membranes treated by the method of this invention as compared with the prior art, the post-treated membranes of in Sample I, Part C of Example 3 and the membranes of Comparative Sample A were washed with a hydrocarbon solvent (cyclohexane) for 25 minutes at room temperature to provide Sample I-W and Comparative Sample A-W, respectively. Following the hydrocarbon wash the membranes were dried in air overnight and tested for hydrogen/methane gas separation.

The results obtained in Examples 3 and 4 are summarized in Table 3.

TABLE 3$^{a,b}$

| Composite Membrane | Treatment | Solvent Exposure | $P/t (H_2)$ ($\times 10^6$) | $\alpha$ ($H_2/CH_4$) |
|---|---|---|---|---|
| Sample I | Amino functional silicone | None | 40.9 | 117 |
| Sample I-W | Amino functional silicone | Hydrocarbon wash | 44.4 | 131 |
| Comparative Sample A | Non-functional siloxane | None | 46.4 | 74 |
| Comparative Sample A-W | Non-functional siloxane | Hydrocarbon wash | 69.6 | 6.5 |

$^a$Gas permeation properties in each example are an average of from two to four membrane modules.
$^b$Gas permeation and separation characteristics were measured with 40/60 hydrogen/methane mixed gas stream at 1480 kPa and ambient temperature. The permeation rates are reported in units of cm$^3$(STP)/cm$^2$ · sec · cm Hg.

The data show that while composite membranes post-treated with nonfunctional silicone completely deteriorated after a short exposure to hydrocarbon solvent, as shown by the sharp drop in selectivity of Comparative Samples A-W, the gas separation and permeation performance of composite membranes post-treated with amino functional siloxane actually improved after exposure to hydrocarbon solvent, as shown by Sample I-W.

What is claimed is:

1. A process for separating a first gaseous component from a mixture thereof with at least one other gaseous component which comprises contacting said mixture with a composite gas separation membrane comprised of a porous substrate having deposited on the surface thereof at least one gas separation layer having a post-treating agent reacted with said gas separation layer through direct ionic bonding, coordination bonding or multiple hydrogen bonding between the post-treating agent and said separation layer, said post-treating agent having a surface tension at 20° C. of less than about 40 dynes/cm and lower than the surface tension of said gas separation layer and reducing the surface energy of said gas separation layer.

2. A process as claimed in claim 1 wherein said treating agent is a functionally-reactive oligomer or polymer ionically bonded to said gas separation layer.

3. A process as claimed in claim 2 wherein said treating agent is monofunctional.

4. A process as claimed in claim 2 wherein said treating agent is polyfunctional.

5. A process as claimed in claim 2 wherein said treating agent is an amino-functional siloxane.

6. A process as claimed in claim 2 wherein said treating agent is a fluorocarbon containing aminofunctional groups or an aminofunctional siloxane containing perfluorohydrocarbon groups.

7. A process as claimed in claim 1 wherein said membrane is a hollow fiber.

8. A process as claimed in claim 1 wherein said surface tension is below about 30 dyne/cm.

9. A process as claimed in claim 1 wherein the molecular weight of said treating agent is above 200.

10. A process as claimed in claim 1 wherein said gas separation layer is a sulfonated polysulfone.

11. A process as claimed in claim 1 wherein said gas separation layer is a sulfonated polyphenylene oxide.

12. A composite gas separation membrane comprising a porous substrate having deposited on the surface thereof at least one gas separation layer having a post-treating agent reacted with said gas separation layer through direct ionic bonding, coordination bonding or multiple hydrogen bonding between the post-treating agent and said separation layer, said post-treating agent having a surface tension at 20° C. of less than about 40 dyne/cm and lower than the surface tension of said gas separation layer and reducing the surface energy of said gas separation layer.

13. A composite gas separation membrane as claimed in claim 12 wherein said treating agent is a functionally-reactive oligomer or polymer ionically bonded to said gas separation layer.

14. A composite gas separation membrane as claimed in claim 13 wherein said treating agent is monofunctional.

15. A composite gas separation membrane as claimed in claim 12 wherein said treating agent is polyfunctional.

16. A composite gas separation membrane as claimed in claim 12 wherein the surface tension of said treating agent is below about 30 dyne/cm.

17. A composite gas separation membrane as claimed in claim 12 wherein said membrane is a hollow fiber.

18. A composite gas separation membrane as claimed in claim 17 wherein the substrate of said hollow fiber is a polysulfone.

19. A composite gas separation membrane as claimed in claim 12 wherein the molecular weight of said treating agent is above 200.

20. A composite gas separation membrane as claimed in claim 12 wherein said gas separation layer is a sulfonated polysulfone.

21. A composite gas separation membrane as claimed in claim 12 wherein said gas separation layer is sulfonated polyphenylene oxide.

22. A composite gas separation membrane as claimed in claim 12 wherein said treating agent is an amino-functional siloxane.

23. A composite gas separation membrane as claimed in claim 12 wherein said treating agent is a fluorohydrocarbon containing amino functional groups or an amino functional siloxane containing perfluorohydrocarbon groups.

24. A method for the production of a composite gas separation membrane comprising a porous substrate having deposited on the surface thereof at least one gas separation layer which comprises reacting the surface of said composite gas separation membrane with a post-treating agent through direct ionic bonding, coordination bonding or multiple hydrogen bonding between the post-treating agent and said separation layer, said post-treating agent having a surface tension at 20° C. of less than about 40 dyne/cm and lower than the surface tension of said gas separation layer and reducing the surface energy of said separation layer.

25. A method as claimed in claim 24 wherein the charge of said treating agent is opposite to the charge of said gas separation layer material.

26. A method as claimed in claim 24 wherein a pressure differential is maintained across the membrane.

27. A method as claimed in claim 24 wherein said treating agent is a functionally-reactive oligomer or polymer ionically bonded to said gas separation layer.

28. A method as claimed in claim 27 wherein said treating agent is monofunctional.

29. A method as claimed in claim 27 wherein said treating agent is polyfunctional.

30. A method as claimed in claim 27 wherein said treating agent is an amino-functional siloxane.

31. A method as claimed in claim 27 wherein said treating agent is a fluorohydrocarbon containing amionofunctional groups or an amionofunctional siloxane containing perfluorohydrocarbon groups.

32. A method as claimed in claim 24 where said composite gas separation membrane is subjected to a hydrocarbon wash treatment.

* * * * *